United States Patent [19]

Slepian et al.

[11] Patent Number: 5,277,551
[45] Date of Patent: Jan. 11, 1994

[54] SUBMERSIBLE SINGLE PHASE ELECTROMAGNETIC PUMPING ASSEMBLY FOR LIQUID METAL

[75] Inventors: Robert M. Slepian, Wilkinsburg, Pa.;
Alvin R. Keeton, The Colony, Tex.;
Charles P. Nyilas, Monroeville, Pa.

[73] Assignee: Westinghouse Electric Corp., Pittsburgh, Pa.

[21] Appl. No.: 945,456

[22] Filed: Sep. 16, 1992

[51] Int. Cl.⁵ .............................................. H02K 44/06
[52] U.S. Cl. ...................................... 417/50; 417/244; 310/11
[58] Field of Search ...................... 417/50, 244; 310/11

[56] References Cited

U.S. PATENT DOCUMENTS

| | | | |
|---|---|---|---|
| 966,423 | 8/1910 | Blauvelt | 417/244 |
| 4,212,592 | 7/1980 | Olich et al. | 417/50 |
| 4,635,705 | 1/1987 | Kuznetsov | 164/466 |
| 4,786,237 | 11/1988 | Hans | 417/50 |
| 4,842,170 | 6/1989 | Del Vecchio et al. | 222/594 |
| 4,928,933 | 5/1990 | Motomura | 266/237 |
| 4,988,267 | 1/1991 | Yamada | 417/50 |
| 5,042,969 | 8/1991 | Odd | 417/50 |

Primary Examiner—Richard A. Bertsch
Assistant Examiner—David W. Scheuermann
Attorney, Agent, or Firm—Daniel P. Cillo

[57] ABSTRACT

A submersible, single phase electromagnetic pumping assembly (10) for liquid metal is made, which contains a submersible pump section (16) and a nonsubmersible pump section (18) connected by a hollow conduit (20) where single phase electromagnetic windings (22 and 24) are disposed in each pump section, providing a two stage pumping assembly, and an eddy current blocking electromagnetic winding (22 and 24), providing liquid flow orifices unoccupied by the structure within each pump section near the winding, and where the single phase coils can create a pulsed, standing magnetic wave within each liquid flow orifice.

10 Claims, 3 Drawing Sheets

SUBMERSIBLE SINGLE PHASE ELECTROMAGNETIC PUMPING ASSEMBLY FOR LIQUID METAL

BACKGROUND OF THE INVENTION

Hundreds of millions of aluminum die-cast parts are made in the United States every year. These parts are produced by many manufacturers on a number of different types of casting machines, but quality and yield of the die-cast parts are concerns common to all manufacturers. For those areas of the market where quality is a primary concern, particularly for suppliers to the automotive industry, new improved die-casting processes need to be improved to the extent that die-cast pieces can replace aluminum forgings.

Molten metal transfer for aluminum die casting and other processes generally includes two operations: transfer of the molten metal from the melting furnace to the holding furnace, and transfer from the holding furnace to the shot chamber of the die-casting machine. Two important facts in the final quality of the die-cast pieces are the cleanliness of the aluminum transferred into the die and the amount of entrapped air. The processes used to transfer metal between work stations and to introduce the metal into the die strongly affect these two factors. Prolonged contact of the molten aluminum with oxygen will generate oxides which float on top of the aluminum melt, and poor metal handling can cause the presence of these oxides in finished pieces. Poor metal handling can also cause gases to become mixed with the aluminum during freezing in the die to make a solid part, which results in internal voids and weakened parts.

Usually, a single large-volume melting furnace is used to supply molten metal to smaller holding furnaces at die casting machines. The transfer mechanism must be able to provide a continuous supply of molten metal to the holding furnaces. This transfer is usually accomplished by manual or mechanized ladling. Some problems associated with transfer ladles are the buildup of dross and agitation, leading to non-metallic inclusions in the product, and the labor intensive nature of such transfer. Electromagnetic pumps have been used to some extent but those available have proven to be rather fragile and somewhat costly to maintain.

U.S. Pat. No. 4,212,592 (Olich et al.), teaches a self-priming, low friction, electromagnetic, partial-immersion pump for molten metals. There, a rotating magnetic field, perpendicular to molten aluminum flow, generates currents in the molten metal and with an inlet swirl inducer causes rotation of the molten metal about the axis of the pump structure, which comprises a high permeability stainless steel cylinder covered with ceramic mat and silicon carbide. All the core and windings operate outside the molten metal bath, while part of the swirl inducer is immersed. The currents produced, interact with the magnetic field and a torpedo inductor to provide a forward propelling force in the molten metal. A single set of polyphased, solid, small winding wires, and an iron core, are energized to commence pumping action of the traveling magnetic wave type created by multiple windings and balanced polyphase excitation. Air is circulated through the entire pump and around the metal windings and core as a coolant, to keep the environment near the windings and core below their Curie Temperature, in order to maintain the magnetic properties of the core.

In U.S. Pat. No. 4,842,170 (Del Vecchio et al.), monophase electromagnetic field operations are detailed for flow control devices used to control molten metal flow. Here, a variety of torpedo vane styles are utilized. U.S. Pat. No. 4,786,237 (Hans), teaches an induction, complete-immersing pump, utilizing electromagnetic fields to pump liquid aluminum. Inert gas, preferably nitrogen, fed down the length of the pump through a gas feed line, is used to cool the metal and present copper oxidation. All the windings and the core within the housing are immersed in the molten metal bath, and liquid aluminum is drawn through a porous ceramic plate by the electromagnetic forces. The use of small wire induction coils would be difficult to cool and indicates use of polyphase excitation. Here, a major amount of magnetic material must be cooled below its Curie Temperature, here, by the expensive means of an oxygen flushing, metal cooling inert gas.

U.S. Pat. No. 4,988,267 (Yamada), teaches an exterior, electromagnetic pump for supplying molten aluminum to a casting machine. The pump is completely exterior to the molten aluminum bath. The machine has a cylindrical core of ferromagnetic material surrounded by a supported ceramic core protection tube to prevent core erosion by the molten metal. A traveling magnetic field is utilized here, which propels the core in the axial direction against the end of the ceramic core protection tube, and could lead to cracking of the ceramic if clearances are too large.

Use of magnetic materials in the Olich et al., Hans, and Yamada pumps, limits the use of those devices to applications where temperatures do not exceed the Curie Temperature of the magnetic material, or else cooling of the magnetic materials must be provided, and where the saturation flux-density must be kept at a high level.

In U.S. Pat. No. 4,928,933 (Motomura), a molten metal supply system for an injection mold is taught, where an electromagnetic pump has two, separately controlled, sets of coils, that is, immersed coils for heating the molten metal and non-immersed coils for pumping the molten metal. A polyphase power supply is used. Because of the polyphase nature of the groups of windings, insulation requirements of the small wires will limit machine operation to much lower temperatures than the molten material being pumped, and so, significant cooling would be required. U.S. Pat. No. 4,635,705 (Kuznetsov) is another example of pumping molten metal using a polyphase electromagnet pump. Here, a strip casting operation is taught, and a detailed description of traveling waves associated with such polyphase electromagnetic pumps is presented.

None of these pumps provide a simple, co pact self-priming device, where the immersed stage can operate without cooling. It is one of the main objects of this invention to provide a simple, compact, dual stage, self-priming electromagnetic pump, where the immersible stage utilizes only standing magnetic waves and can be operated without cooling if required.

SUMMARY OF THE INVENTION

Accordingly, the invention resides in a submersible, single-phase electromagnetic pumping assembly for liquid metal, having an entrance end and an exit end and containing electromagnet windings, characterized in that the assembly contains a submersible pump section near the entrance end and a non-submersible pump section near the exit end, both pump sections connected by a hollow conduit, where separate single-phase electromagnetic windings are disposed in each pump section, providing a two stage pumping assembly, and an eddy current blocking structure is disposed within each single-phase electromagnetic winding, providing liquid flow orifices unoccupied by the structure within each pump section near the winding, and where the single phase coils can create a standing magnetic wave within each liquid flow orifice.

Preferably, the windings are only a single layer, the electromagnet coil in the non-submersible pump section is liquid cooled, the conduit continues through each pump section, and the eddy current blocking structures are circumferentially spaced apart vanes extending radially outward from a central torpedo type post, where the vanes and post are ceramic. Also, the electromagnetic windings in the submersible pump section of the pumping assembly can be uncooled or liquid cooled, and can be used only at initial priming or run continuously, depending on need. The hollow conduit connecting pump sections can be heated if desired. No thick coils of multiple windings of fine wire, or heavy magnetic materials, such as high permeability iron cores, typical of standard motors, are used in this pumping assembly.

The use of single phase excitation and standing magnetic waves, created preferably by a single winding of large diameter wire, and elimination of ferromagnetic cores, solves many cooling and insulation problems found in the prior art and allows compactness and simplicity in the pump design. Use of windings in the submersible end of the pumping assembly allows self-priming and ease of use in existing molten metal baths. This design also uses rugged parts without precision alignment or machining requirements. The design contains essentially seven parts, two pump portions, two eddy current blocking structures, two electromagnetic windings with associated electrical leads, and a connecting conduit, allowing easy, non-complicated maintenance and inexpensive, primarily ceramic parts in contact with molten metal.

BRIEF DESCRIPTION OF THE DRAWINGS

In order that the invention can be more clearly understood, convenient embodiments thereof will now be described, by way of example, with reference to the accompanying drawings in which.

DESCRIPTION OF THE PREFERRED EMBODIMENTS

Figure 1:
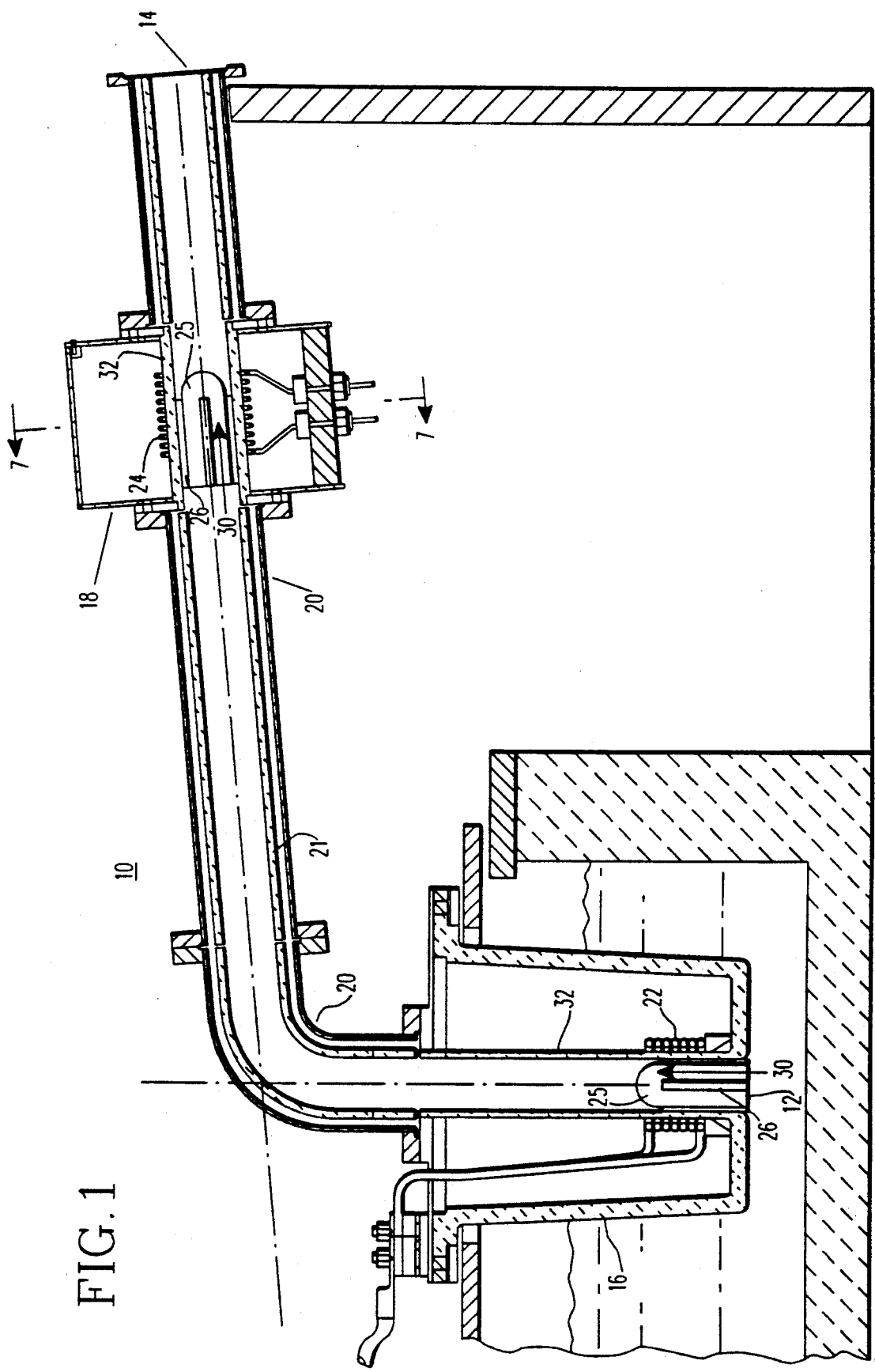
FIG. 1, which best illustrates the invention, shows a cross-sectional view of one embodiment of a selfpriming, two stage, single phase electromagnetic pumping assembly for liquid metal, according to this invention.

Referring now to FIG. 1 of the drawings, a self-priming, two stage, single phase electromagnetic pump or pumping assembly is shown as 10. The pumping assembly has an entrance end 12 and an exit end 14. There is a submersible pump section 16 near the entrance end 12, and a non-submersible pump section 18 near the exit end 14. Both pump sections 16 and 18 are connected by hollow conduit 20, usually made of steel lined inside with ceramic 21, the ceramic portion of which continues through each pump section 16 and 18, as shown. The conduit can be heated, particularly in cases where molten metal is maintained within the conduit for extended periods, as between casts. This heating can be accomplished by using external, insulated radiant heaters or wound high resistance wires (not shown), to raise the temperature of the outside steel of conduit 20 and also the ceramic liner 21 to the molten metal temperature. Submersible pump section 16 has single-phase electromagnetic windings 22 and non-submersible pump section has separate single-phase electromagnetic windings 24, providing a two stage pumping assembly.

Figure 2:
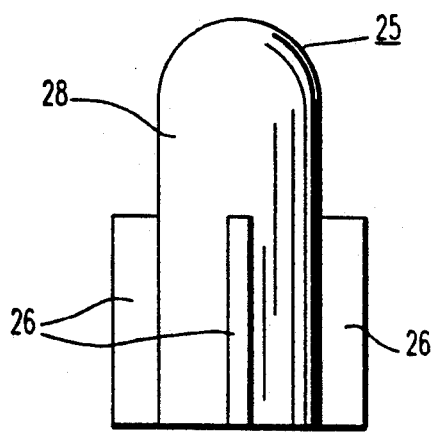
FIG. 2 is an enlarged side elevational view of one type of solid eddy current blocking structure of the torpedo type which may be disposed in the cross section of each pump section.
Figure 3:
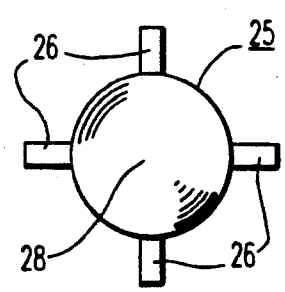
FIG. 3 is a top plan view of the solid structure of FIG. 2.
Figure 4:
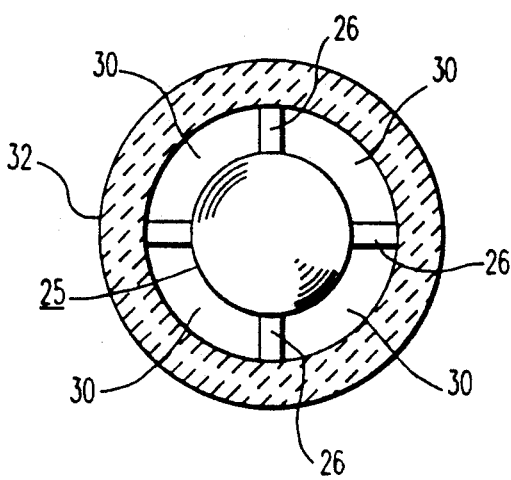
FIG. 4 is a top plan view of the eddy current blocking structure of FIGS. 2 and 3, in place within a conduit, where surrounding wire windings are not shown.
Figure 5:
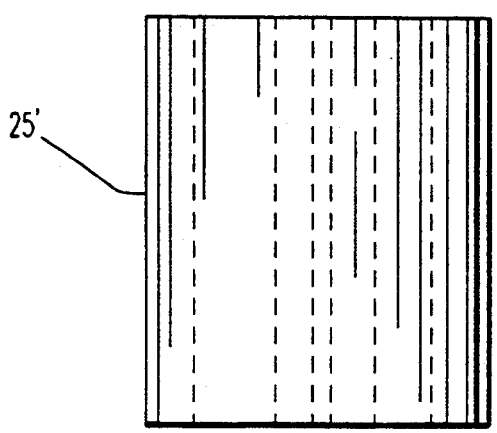
FIG. 5 is a side elevational view of one type of alternate eddy current blocking structure of the annular ring type.
Figure 6:
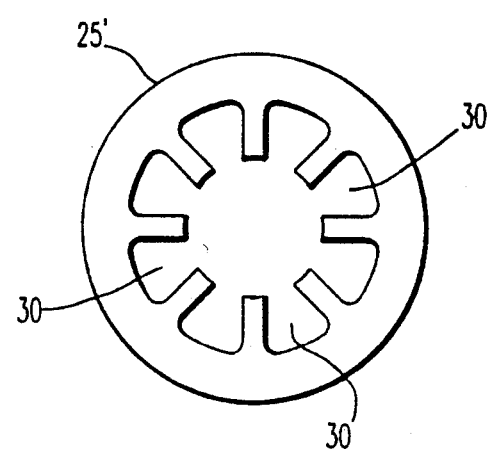
FIG. 6 is a top plan view of the eddy current blocking structure of FIG. 5 showing interior, circumferentially spaced apart ribs or vanes, to provide multi petal shaped orifices.

In each pump section 16 and 18, an eddy current blocking structure 25 is placed near the electromagnetic windings 22 or 24 within the hollow, central cross section of that pump section. FIGS. 2, 3 and 4 show one type of eddy current blocking structure 25, comprising circumferentially spaced apart vanes 26 which extend radially outward from a solid, central, torpedo type post 28, and create liquid flow orifices 30 unoccupied by the structure 25 within each single phase winding 22 and 24, and within the conduit continuation 32 near the single-phase windings 22 and 24, as shown in FIG. 4. One alternate design for an eddy current blocking structure 25' is shown in FIGS. 5 and 6. These blocking structures 25, 25', as well as pump wall 16 are usually a high temperature ceramic such as fused silica, alumina, alumina titanate, and the like. Pump wall 18 can be ceramic or metal.

Referring back to FIG. 1, the electromagnetic windings 22 and 24 surround the liquid flow orifices 30 between vanes 26 and can be operated to produce a magnetic field primarily axially directed along arrow 30, and eddy currents azimuthally directed, transverse to arrow 30, within the flowing liquid metal. The substantially nonelectrically conductive eddy current blocking structures 26 and 28 define eddy current flow regions 30 in the orifices, and eddy current non-flow regions in the post and vane or other type structure.

The eddy current non-flow regions of the eddy current structure 26 and 28 are designed so as to substantially block production of eddy currents in the liquid metal as it would flow through the eddy current blocking structure. This results in a reshaping of the magnetic field within the conduit continuation 32, at a region of transition in the conduit between the occupied and unoccupied portions of the conduit continuation 32. This provides a radially directed magnetic component which produces a substantially axially directed pumping force in the axial direction of the conduit and conduit continuation, and which controls the flow of liquid metal therethrough. A detailed description of such magnetic field effects and of the eddy current blocking structures can be found in U.S. Pat. No. 4,842,170, herein incorporated by reference.

Generally, the electromagnetic windings 22 and 24, which are connected to a power supply having a high frequency, which depends on the conductivity of pumped material and the flow channel geometry, to produce a pulsed, single phase, standing magnetic wave, rather than a polyphased traveling magnetic wave.

The use of a single-phase standing magnetic wave as in this invention leads to a compact design as the requirement of multiple winding poles for traveling waves is removed. The use of a high frequency leads to consideration of a tuned circuit to excite the single-phase winding. These supplies can easily be adjusted to run with the high coil current consistent with a low number of turns. Taken together with the compact coil size, an optimum design is one in which a relatively few turns of large wire is used allowing room for extremely rugged, high-temperature insulation.

Figure 7:
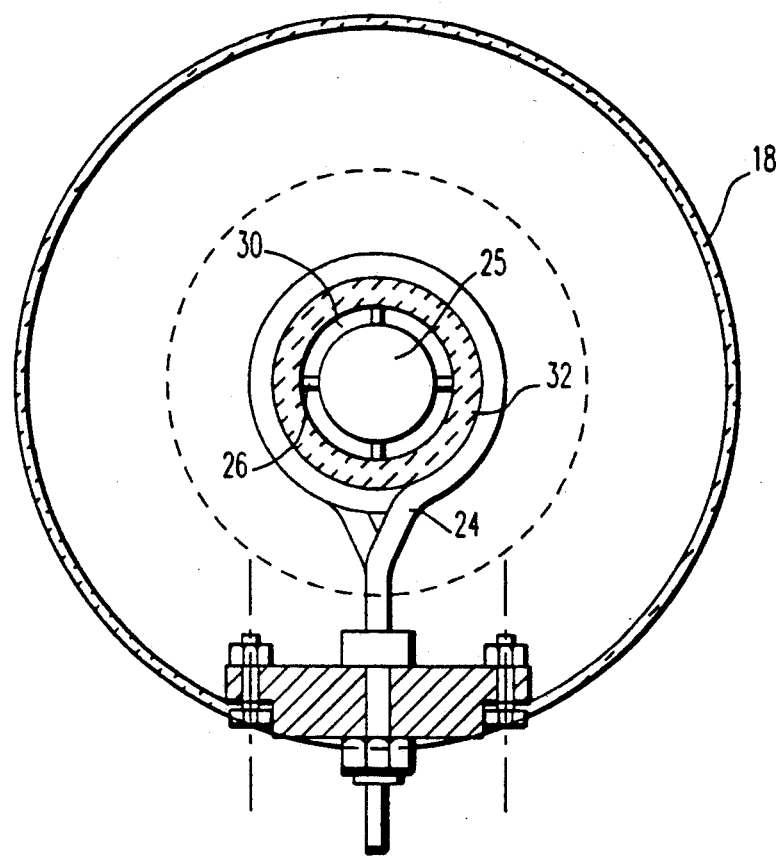
FIG. 7 is a simplified top plan view along line VII—VII of FIG. 1 showing water cooled windings in pump section 18.

One cooling design for the non-submersible pump section 18 is shown in FIG. 7. Liquid such as water or oil, or a gas such as air can be passed through the windings 24 which are hollow and usually made of copper for continuous, efficient, high power, low cost, safe operation. The windings 22 for the submersible pump section 16 are usually solid, uncooled, and made of a high melting point metal, such as molybdenum. A lower melting point material could be used if the required head and duty cycle are both small.

The following example further illustrates the invention and should not be considered limiting in any way.

EXAMPLE

A submersible, two stage, single-phase electromagnetic somewhat similar to that shown in FIG. 1 of the drawings was constructed as described in detail below.

There were three main components of the experimental system; the submersed pump, the external pump, and the heated piping. Each of these components were used with two-stage operation in which the submersed pump was uncooled. These three components are described below. Both pumps were excited by a single-phase ac power supply operating at a nominal frequency of 1400 Hz and operated efficiently to pump molten aluminum metal.

Submersed Pump

The submersed pump acts as a priming pump in two-stage operation. In one configuration the submersed pump was pulsed only long enough to prime the external pump. The priming pump featured a seven turn solenoidal coil wound of a solid copper conductor of cross-section 0.635 cm (0.25 inch) by 1.27 cm (0.5 inch). It was wound such that the narrow edge of the conductor formed the inner diameter (ID) of the coil. The ID of the coil was 6.66 cm (2.625 inch).

The coil sat within a ceramic chamber constructed of fused silica. The chamber was cylindrically shaped, having a 21.59 cm (8.5 inch) ID and a 1.27 cm (0.5 inch) wall, with a flat plate at the bottom and an annular mounting flange at the top. There was a hole in the flat bottom plate to which a 0.58 cm (0.23 inch) thinwalled pipe was attached. The thin-walled pipe ran the length of the outer cylinder and protruded through the center of the solenoidal coil. The coil and pipe were concentric with a gap between the pipe OD and the coil ID.

Located within the pipe at the approximate height of the coil was a torpedo-shaped insert as shown in FIG. 2. It was also constructed of fused silica. The gap between the torpedo insert and the cylinder ID was 0.508 cm (0.2 inch) with the torpedo attached to the cylinder by four fins, each 0.635 cm (0.25 inch) thick. The outer cylinder, bottom plate, mounting flange, inner pipe, and torpedo-shaped insert may be manufactured as one piece or as separate pieces which are then rigidly joined together. In the present apparatus, the outer cylinder, bottom plate, mounting flange, and inner pipe were cast as one piece, and a separate insert was then attached. The coil sat on a refractory felt pad atop a pedestal on the bottom plate.

Attached to the mounting flange at the top of the ceramic chamber was a stainless steel cover plate. Between the steel plate and the mounting flange was a refractory felt gasket to improve compliance and seal the joint. The coil leads (extensions of the coil conductor) extended through a cut-out of the plate. In a similar manner, the central pipe extended just beyond the top of the plate so that a gasket could be compressed when the piping was bolted to the cover.

External Pump

The external pump consisted of a solenoidal coil wound around a cylindrical ceramic nozzle in which was located a torpedo-shaped insert. The coil was a ten-turn winding of 0.635 cm (0.25 inch) by 1.27 cm (0.5 inch) hollow copper conductor with a wall thickness of 0.124 cm (0.049 inch). As with the submersed pump, the ceramic part was made of fused silica with a life-extending coating on surfaces which contact the molten aluminum. The geometry of the insert, nozzle, and coil ID was nominally the same for this pump as for the insert, pipe, and coil ID of the submersed pump.

In the external pump, the ceramic cylinder and flat bottom plate of the submersed pump were replaced by a stainless steel cylinder and integral flat bottom plate (also of stainless steel). A stainless steel top plate bolted to the upper edge of the cylinder and trapped the nozzle in place as well as allowing attachment of the heated piping (as did the bottom plate). The ID of the stainless steel cylinder was 25.4 cm (10 inch) while the top and bottom plates were located 6.35 cm (2.5 inch) from the ends of the coil. Coil leads were brought out radially through a cut-out in the cylinder wall where a ceramic plate positioned the leads, and hence the coil, with respect to the nozzle.

Heated Piping

Heated piping was used to transport the molten metal between the two pumping stages and, ultimately, to a die-caster. Heated piping was required for the die-casting application because of the extended periods between casts where molten metal is maintained within the piping. Letting the metal return to the furnace between casts is discouraged as it allows the formation and accumulation of oxides on the pipe walls which will be carried into the die and reduce quality of the cast parts.

Here, a ceramic liner of aluminum titanate was used inside of 7.62 cm (3 inch) steel piping. Standard radiant heaters or high resistance ohmic heaters were used to heat the piping and were controlled by feedback thermocouples and standard temperature controllers. Steel flanges were welded to the steel pipes and were used to connect adjacent sections of piping and to attach the piping to the pumps. Adjacent sections of the ceramic liners were butted against each other with a gasket in between and secured when the steel flanges were bolted together. One section of the piping was shaped as an 85° elbow where the 5° inclination was present to allow the aluminum to drain into the holding furnace when power was removed.

We claim:

1. A submersible, single-phase electromagnetic pumping assembly for liquid metal, having an entrance end and an exit end and containing electromagnetic windings, comprising a submersible pump section near the entrance end and a non-submersible pump section near the exit end, both pump sections connected by a hollow conduit, where separate single-phase electromagnetic windings are disposed in each pump section, providing a two stage pumping assembly, and an eddy current blocking structure is disposed within each single-phase electromagnetic winding, providing liquid flow orifices unoccupied by the structure within each pump section near the winding.

2. The assembly of claim 1, where the electromagnetic windings in each pump section are a single layer.

3. The assembly of claim 1, where both the pump sections are liquid cooled.

4. The assembly of claim 1, where the nonsubmersible pump section has hollow copper electromagnetic windings where liquid passes through the windings to cool the pump, and where the submersible pump section has solid electromagnetic windings of a high meeting point metal.

5. The assembly of claim 1, where the conduit is heated, and constructed of an inner ceramic portion which continues through each pump section, and an outer metal section.

6. The assembly of claim 1, operated by inserting the submersible pump section in molten aluminum, where the submersible pump windings are below the molten aluminum surface and the other pump section is above the molten aluminum surface and where the submersible pump section is energized to prime the other pump section.

7. The assembly of claim 1, where the eddy current blocking structures are ceramic and comprise circumferentially spaced apart vanes extending radially outward from a central, torpedo type post and are disposed within the hollow, central cross section of the pump sections.

8. The assembly of claim 7, wherein the eddy current blocking structures of torpedo type post and spaced apart vanes substantially block production of eddy currents in liquid metal as it would flow through each pump section, to produce an axially directed pumping force.

9. The assembly of claim 1, where the nonsubmersible pump section is liquid cooled.

10. The assembly of claim 9, where the nonsubmersible pump section is water cooled.

* * * * *